United States Patent
Landers et al.

(10) Patent No.: US 10,445,918 B2
(45) Date of Patent: Oct. 15, 2019

(54) SYSTEMS, METHODS, AND MACHINE-READABLE STORAGE MEDIA FOR PRESENTING ANIMATIONS OVERLYING MULTIMEDIA FILES

(71) Applicant: LEAF GROUP LTD., Santa Monica, CA (US)

(72) Inventors: Monica Winn Landers, Austin, TX (US); Ryan Christopher Hayes, Austin, TX (US)

(73) Assignee: LEAF GROUP LTD., Santa Monica, CA (US)

( * ) Notice: Subject to any disclaimer, the term of this patent is extended or adjusted under 35 U.S.C. 154(b) by 0 days.

(21) Appl. No.: 14/736,121

(22) Filed: Jun. 10, 2015

(65) Prior Publication Data
US 2015/0279080 A1    Oct. 1, 2015

Related U.S. Application Data

(63) Continuation of application No. 12/859,215, filed on Aug. 18, 2010, now Pat. No. 9,071,885.

(51) Int. Cl.
G06T 13/80 (2011.01)
H04N 21/81 (2011.01)
(Continued)

(52) U.S. Cl.
CPC .......... *G06T 13/80* (2013.01); *G06F 17/2235* (2013.01); *H04N 5/76* (2013.01);
(Continued)

(58) Field of Classification Search
None
See application file for complete search history.

(56) References Cited

U.S. PATENT DOCUMENTS 6,268,864 B1    7/2001    Chen et al.
7,131,065 B1    10/2006   Kane
(Continued)

FOREIGN PATENT DOCUMENTS

KR    1020070095506    10/2007
WO    2008137482       11/2008
(Continued)

OTHER PUBLICATIONS

International Patent Application Serial No. PCT/US2011/042695, International Search Report and Written Opinion, dated Feb. 28, 2012.

(Continued)

*Primary Examiner* — Ryan McCulley
(74) *Attorney, Agent, or Firm* — Greenberg Traurig, LLP (57) ABSTRACT

Provided are systems, methods, and machine-readable storage media for presenting animations overlying multimedia files in accordance with the present disclosure. Embodiments are described for linking an animation to a multimedia file and presenting the animation overlying a concurrent playback of the multimedia file (e.g., its content). Embodiments are described for including additional elements to the presentation of the animation outside of the playback of the animation, including residual elements that relate to the content of the animation and/or allow a user to receive further information about the content of the animation. Embodiments are described for linking an animation to more than one multimedia file.

15 Claims, 7 Drawing Sheets

(51) Int. Cl.
*H04N 21/858* (2011.01)
*H04N 5/76* (2006.01)
*G06F 17/22* (2006.01)
*G11B 27/10* (2006.01)
*G11B 27/11* (2006.01)

(52) U.S. Cl.
CPC ......... *H04N 21/812* (2013.01); *H04N 21/858* (2013.01); *G11B 27/10* (2013.01); *G11B 27/11* (2013.01)

(56) References Cited

U.S. PATENT DOCUMENTS

| | | | |
|---|---|---|---|
| 7,987,483 | B1 | 7/2011 | Des Jardins |
| 9,071,885 | B2 | 6/2015 | Landers et al. |
| 2003/0156113 | A1 | 8/2003 | Freedman et al. |
| 2006/0080167 | A1 | 4/2006 | Chen et al. |
| 2007/0027844 | A1 | 2/2007 | Toub et al. |
| 2007/0250901 | A1 | 10/2007 | McIntire et al. |
| 2008/0077952 | A1 | 3/2008 | St. Jean et al. |
| 2008/0235092 | A1 | 9/2008 | Song et al. |
| 2008/0276272 | A1 | 11/2008 | Rajaraman et al. |
| 2008/0291218 | A1 | 11/2008 | Sheng et al. |
| 2008/0319852 | A1 | 12/2008 | Gardner et al. |
| 2009/0022473 | A1* | 1/2009 | Cope .................... H04N 9/8205 386/278 |
| 2009/0165140 | A1 | 6/2009 | Robinson et al. |
| 2009/0254931 | A1 | 10/2009 | Pizzurro et al. |
| 2010/0049709 | A1 | 2/2010 | Ravikumar et al. |
| 2010/0058200 | A1 | 3/2010 | Jablokov et al. |
| 2011/0137753 | A1* | 6/2011 | Moehrle ................ G06Q 30/02 705/27.1 |
| 2011/0178854 | A1 | 7/2011 | Sofer et al. |
| 2011/0208580 | A1 | 8/2011 | Wolinsky |
| 2012/0044250 | A1 | 2/2012 | Landers et al. |

FOREIGN PATENT DOCUMENTS

| | | |
|---|---|---|
| WO | 2012021224 | 2/2012 |
| WO | 2012024027 | 2/2012 |

OTHER PUBLICATIONS

Blodget, Henry, "Google Working on Secret New Ad Format: Interactive Video Ads", Business Insider, Jul. 11, 2010. Available at: http://www.businessinsider.com/google-new-ad-format-interactive-video-ads-2010-7.

International Patent Application Serial No. PCT/US2011/042458, International Search Report and Written Opinion, dated Feb. 9, 2012.

Yoon, Ju-Hyoung et al. "An Object Model of Korean Web Pages for Title Identification", 15th Annual Conference on Human and Cognitive Language Technology, 2003, 5 pages.

* cited by examiner

SYSTEMS, METHODS, AND MACHINE-READABLE STORAGE MEDIA FOR PRESENTING ANIMATIONS OVERLYING MULTIMEDIA FILES

RELATED APPLICATIONS

This application claims the benefit of and is a continuation of U.S. patent application Ser. No. 12/859,215, filed on Aug. 18, 2010, which is incorporated by reference in its entirety.

FIELD OF THE TECHNOLOGY

At least some embodiments of this disclosure relate to animations and multimedia files, and more particularly but not limited to, presenting animations overlying a concurrent playing of the multimedia file.

BACKGROUND

Advertisement systems may include several ways of associating particular advertisements with other presentations, such as presentations of multimedia files. For example, content in multimedia files may suggest a particular demographic of those likely to watch the presentation of the content, and thereby suggest a particular advertisement.

SUMMARY OF THE DESCRIPTION

Systems, methods and machine-readable storage media for presenting animations overlying multimedia files in accordance with the present disclosure are described herein. Some embodiments are summarized in this section.

In one embodiment, the disclosure describes a method, which may be implemented on a computer, whereby the method includes selecting a first trigger related to a multimedia file and a first time code related to the first trigger, preparing an instruction to play an animation overlying the multimedia file beginning from a first placement point and at the first time code, and transmitting the instruction to a multimedia player configured to play the multimedia file.

In another embodiment, the disclosure describes a method, which may be implemented on a computer, whereby the method includes receiving content information relating to a multimedia file, the content information including a plurality of placement points and a plurality of time codes, each placement point containing at least two spatial coordinates, wherein the plurality of placement points comprises a first placement point, and the plurality of time codes comprises a first time code. The method further includes transmitting an instruction to a multimedia player to initiate playing, beginning at the first time code and located at the first placement point, of a multi-dimensionally linked animation (MLA) on a visual layer overlaying the multimedia file, wherein the instruction includes the first placement point and the first time code.

In another embodiment, the disclosure describes a method, which may be implemented on a computer, whereby the method includes presenting an advertisement selection interface including a representation of a plurality of multimedia files and a selected common selection criterion related to each of the plurality of multimedia files. The method further includes presenting an indication of a placement point and a time code of a multimedia file, the multimedia file included in the plurality of multimedia files. The method further includes receiving a selection of the placement point and the time code in the first multimedia file, and preparing an instruction for a multimedia player to link a playing of the animation with a concurrent playing of the first multimedia file at the first placement point and the first time code.

In another embodiment, the disclosure describes a method, which may be implemented on a computer, whereby the method includes presenting, via a multimedia player, a multimedia file, determining that a content item is presented as part of the multimedia file and, in response to the determining, presenting, via the multimedia player, an animation overlying the multimedia file, wherein the presenting the animation is coordinated to begin when the content item is presented.

Other embodiments and features of the present disclosure will be apparent from the accompanying drawings and from the detailed description that follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Provided are systems, methods, and machine-readable storage media for presenting animations overlying multimedia files in accordance with the present disclosure. Embodiments are described for linking an animation to a multimedia file and presenting the animation overlying a concurrent playback of the multimedia file (e.g., its content). Embodiments are described for including additional elements to the presentation of the animation outside of the playback of the animation, including residual elements that relate to the content of the animation and/or allow a user to receive further information about the content of the animation. Embodiments are described for linking an animation to more than one multimedia file.

As described further herein, an animation may be linked to a multimedia file such that the animation is not part of the multimedia file but is presented when certain events (e.g., triggering events) occur during the playback of the multimedia file. For example, the animation may appear over the presentation of the multimedia file. As described further herein, certain events may occur at certain time codes of the multimedia file that trigger playback of the animation, such as words spoken in an audio track of the multimedia file or the appearance of a particular item in a video portion of the multimedia file. As described further herein, the words spoken in an audio track (e.g., of an audio portion) of the multimedia file may be accessed by systems or processes herein through using a transcript of the audio track, which may be associated with the multimedia file automatically and/or manually. For example, an automatic transcription of the audio track (e.g., machine transcription) may be coupled with manually-added descriptions of events within the contents of the multimedia file. As described further herein, synonyms, and/or subjectively-determined or objectively-determined related words may be automatically included into a transcript of a multimedia file or other group of words associated with the multimedia file. As described further herein, each of the words associated with a multimedia file may be used to link an animation to the multimedia file.

In some embodiments, the animations described further herein may be presented in a non-intrusive manner over the multimedia file and may last for a limited portion of time (e.g., compared to the playback of the multimedia file). For example, the animation lasts for a short period of time, such as 1-10 seconds (e.g., 3 seconds). As described further herein, the multimedia player may be instructed to present additional elements related to the animation after the animation has completed. Also as described further herein, additional elements may be presented related to the animation that allow actions to be performed, such as receiving further information about an advertised product or service included in the animation. For example, the animation may be a product advertisement.

As used herein, the term "animation" may refer to any combination or single type of images, sequences of images, classic animation (e.g., hand-drawn, computer animated), and/or video, both with and without audio components or tracks. A multimedia file may similarly have one or more animation(s) under this definition. Any distinction between animations and multimedia files in this description is only made in order to maintain a frame of reference as to the underlying playback of the multimedia file with the linked, overlying playback of the animation.

Figure 1:
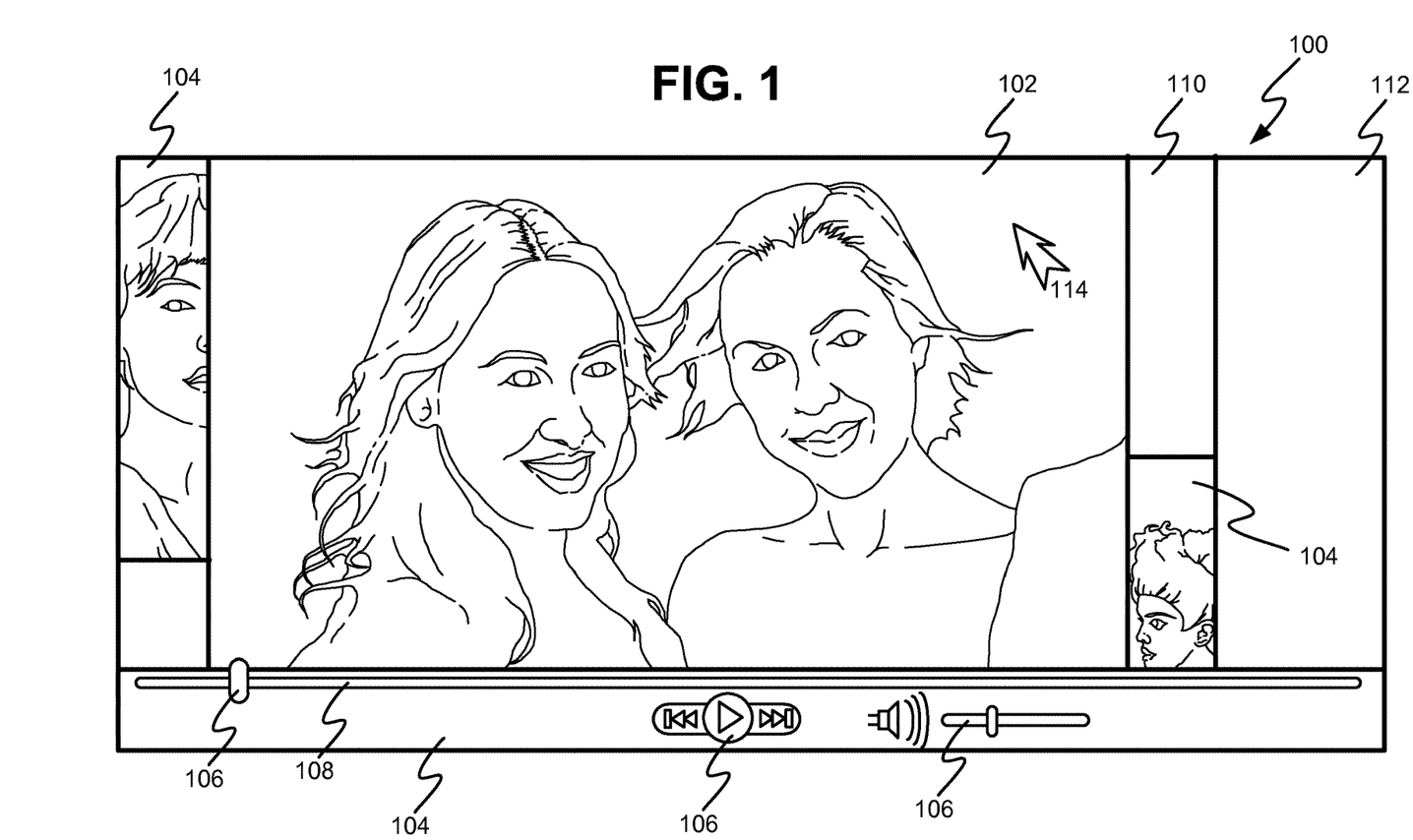
FIG. 1 shows an embodiment of a multimedia player interface during playback of an exemplary multimedia file.

FIG. 1 shows an embodiment of a multimedia player interface 100 during playback of an exemplary multimedia file. The multimedia player interface 100 includes a multimedia file playback portion 102 that displays the contents of the multimedia file during playback. The multimedia player interface 100 includes exemplary playback controls 106, such as playback selection controls, volume controls and time scroll interface. The multimedia player interface also includes a time bar 108 that indicates the position of playback with respect to the total playback length of the multimedia file being played. In one embodiment, a cursor 114 (e.g., representing the position of a mouse) may be used to select the playback controls 106 and manipulate the functions of the multimedia player interface 100, such as during playback of a multimedia file.

In one embodiment, the multimedia player interface 100 includes a shell portion 104 in addition to a showcase portion 110 and extended palette portion 112, and each portion is positioned outside the multimedia playback portion 102. The shell portion 104 may contain design elements (e.g., branding elements) such as logos or other images. In one embodiment, the shell portion 104 displays a static image for a period of time before shifting to another static image.

In one embodiment, as described further herein, the showcase portion 110 contains residual image(s) (e.g., representative image(s)) of advertisements placed over the concurrent playback of a multimedia file. Also as described further herein, in one embodiment, the extended palette portion 112 contains fulfillment information and/or fulfillment links related to animations placed over the concurrent playback of a multimedia file.

In one embodiment, a multimedia player may be operated by a machine and/or processor that presents the multimedia player interface 100. In another embodiment, a multimedia player may be operated by a machine and/or machine separate from the machine that presents the multimedia player interface 100. For example, as described further herein, a machine may operate a multimedia player and transmit data containing the presentation of a multimedia file and/or an animation to a second machine that presents the multimedia player interface 100 within which the playback of the multimedia file and/or the animation is presented.

Figure 2:
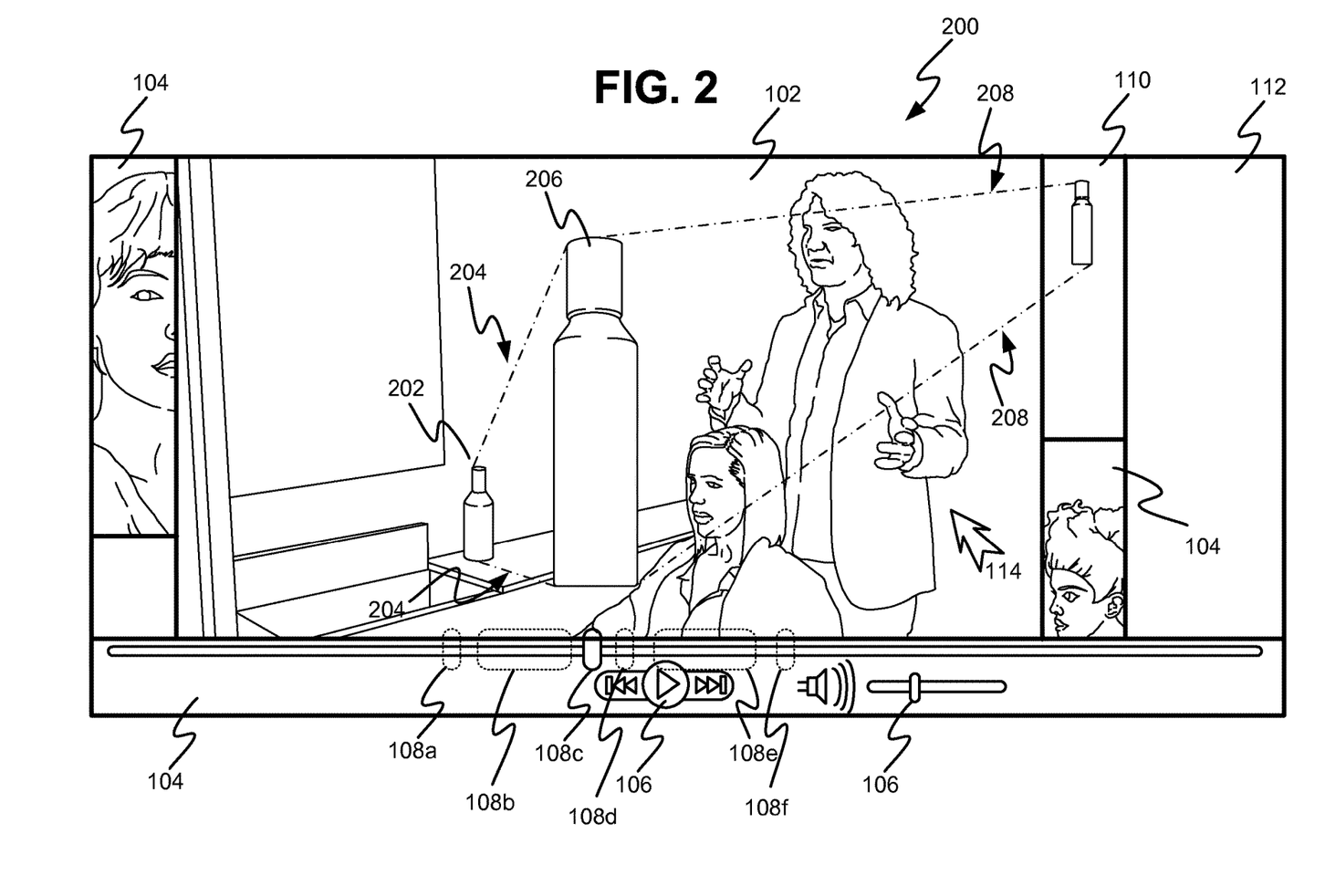
FIG. 2 shows an embodiment of a multimedia player interface during playback of an exemplary multimedia file with a concurrent playing of an animation overlying the multimedia file.

FIG. 2 shows an embodiment of a multimedia player interface 200 during playback of an exemplary multimedia file with a concurrent playing of an animation overlying the multimedia file. In one embodiment, the multimedia player interface contains the multimedia playback portion 102 in which the content of a multimedia file is presented (e.g., an instructional video about hair styling). The time bar 108 indicates a sequence of time codes 108a-108f of the multimedia file, which are illustrated as portions of the time bar. The time scroll interface 106 indicates a present position of the playback with respect to those time codes. Time codes of a multimedia file relate to the chronological order of content that is displayed when a multimedia file is played back. There are multiple ways in which time codes may be represented, for example, by multimedia players and technologies for interfacing with multimedia players. As described further herein, time codes may be assigned using technologies adapted to work with the multimedia player and/or using native features of recording and/or editing equipment that processes the multimedia file.

As described further herein, in one embodiment, a multimedia file's placement points and time codes may be used to link an animation to the multimedia file and the placement points and time codes may be referred to as corresponding to the animation, for example, through the linking of that animation to the multimedia file. For example, a multimedia file's placement points and time codes may be referenced with respect to an animation in order to describe where, and when an animation is linked to the multimedia file. As another example, a multimedia file's placement points and time codes may be referenced with respect to an animation in order to describe how an animation is linked to the multimedia file.

In one embodiment, an animation is linked to a multimedia file without the use of a placement point and/or time code. For example, an animation may be linked to an multimedia file through a word or content item, as described further herein, using a machine transcription or other automatic content recognition technology that identifies a word or content item in the multimedia file and triggers playback of the animation based on that identification. In one embodiment, an automatic recognition technology (e.g., machine transcription) monitors the playback of a multimedia file, performs a recognition function in real-time or near real-time during the playback, and produces indications of recognized content for use along with instructions that link an animation to certain content. For example, a multimedia player may play a multimedia file, content may be automatically recognized (e.g., audio portion transcribed, synonyms matched), and the multimedia player may present an animation based on the content. In another embodiment, a human operator may create a transcription of an audio track of the multimedia file.

Various images of an animation overlying the concurrent playback of the multimedia file in the multimedia player interface may be made to appear at several exemplary placement points 202, 204, 206, and 208 of the multimedia file. As described further herein, the animation may present images in the animation overlying the multimedia file at specific locations of the multimedia playback portion 102 of the multimedia player interface 200. The exemplary placement points 202, 204, 206, and 208 may correspond with particular exemplary time codes 108a-108f of the underlying multimedia file.

In one embodiment, while the multimedia file is being played back, an animation is first presented to a user at a beginning time code 108a, for example, of a video multimedia file then playing and from a beginning placement point 202 (e.g., a location within the video image being presented to a user), for example, based on a triggering event as described further herein. For example, the animation shown at beginning placement point 202 has a beginning image of a bottle of hair product (e.g., styling mousse). The animation then passes through intermediate time codes 108b as the image of the bottle moves and expands across the multimedia file playback portion 102 at intermediate placement points 204 (indicated as arrows showing an exemplary outline of the image placed at the intermediate placement points).

In one embodiment, an animation presented over the multimedia playback portion 102 may reach a featured time code 108c corresponding with a selected intermediate image of the animation placed at featured placement point 206. In one embodiment, the animation may hold the selected intermediate image at the featured placement point 206 for a predetermined time between time codes 108c and 108d. For example, the predetermined time is a time selected and predetermined for users of the multimedia player interface 200 to view the selected intermediate image of the animation (e.g., hair product) at the featured placement point 206.

In one embodiment, the animation may move from the featured placement point 206 through a second set of intermediate placement points 208, while the animation transitions from the selected intermediate image to a residual image 210 located in the showcase portion 110 of the multimedia player interface 200. For example, the second set of intermediate placement points 208 may be a set of placement points for a transition of the animation from the featured placement point to a showcase, namely a set of "showcase transition" placement points. The second set of intermediate placement points 208 for the animation (e.g., showcase transition placement points) correspond to a second set of intermediate time codes 108e (e.g., showcase transition time codes). In one embodiment, an image of the animation appears to a user to fit integrally within the playback of the multimedia file. In another embodiment, an image of the animation appears to a user not to fit integrally within the playback of the multimedia file. In another embodiment, a first image of the animation may appear to fit integrally and a second image may appear not to fit integrally. For example, the apparent effect to a user may be that a bottle appears to be included within the scene of the multimedia file (e.g., a bottle on a countertop), and then the bottle appears to fly forward in front of the multimedia file playback, leaving the scene (e.g., expands in size, changes perspective view to move toward the user). As another example, the apparent effect to a user may be that the object moves (e.g., is animated) relative to the scene of the multimedia file, for example, in a way that fits integrally in a scene of a multimedia file (e.g., choreographed movement) or in a way that does not fit integrally (e.g., contrasting movement). In one embodiment, as described further herein, images of the animation may move across the multimedia playback portion and come to a rest within the showcase portion.

In one embodiment, the second set of intermediate placement points 208 corresponds to a sequence of images of the animation. In one embodiment, the placement points 208 lead in a line between the featured placement point 206 and a residual image 210 located in the showcase portion 110. In another embodiment, the second set of intermediate placement points 208 lead elsewhere in the multimedia file playback portion 102. In one embodiment, the second set of intermediate placement points (e.g., showcase transition placement points) end near a showcase portion 110 of the multimedia player interface 100 and/or a residual image 210.

In one embodiment, the animation has an ending time code 108f corresponding to the animation ceasing to be presented in the multimedia file playback portion 102. For example, the ending time code 108f may correspond to a final image of the animation's sequence of images.

Figure 3:
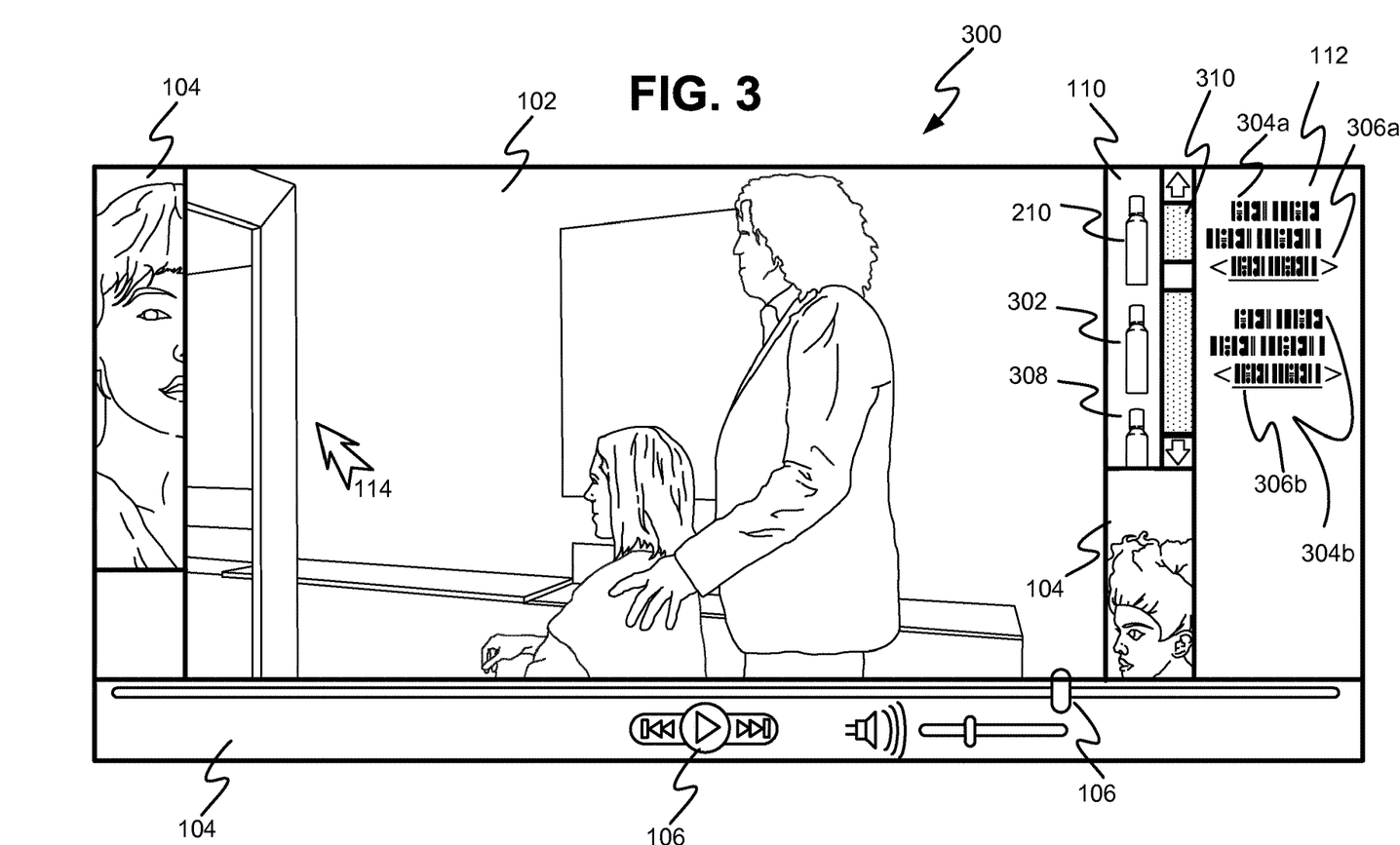
FIG. 3 shows an embodiment of a multimedia player interface during playback of an exemplary multimedia file, also showing a residual image of an animation and associated content displayed in portions of the multimedia player interface.

In one embodiment, placement points 202, 204, 206, and 208 are arranged with corresponding time codes 108a-108f to make the animation's sequence of images appear to move across the multimedia file presentation portion 102 of the multimedia player interface 300. For example, the placement points 202, 204, 206, and 208 may be separated or otherwise arranged to make the images appear to move across a screen with the passage of time. In another embodiment, one or more of placement points 202, 204, 206, and 208 may be at the same location. For example, placement points 202, 204, 206, and 208 may refer to the same location or otherwise be arranged such that one or more images of the animation may appear to remain at a stationary location in the multimedia file presentation portion 102.

In one embodiment, placement points 202, 204, 206, and 208 are arranged with corresponding time codes 108a-108f to make the animation's sequence of images appear continuous (e.g., smooth) during playback. For example, an animation's sequence of images may appear to stop or reverse directions during play. In another embodiment, the arrangement of placement points 202, 204, 206, and 208 with corresponding time codes 108a-108f may make the animation's sequence of images appear to be discontinuous. For example, a set of intermediate placement points may include placement points that are so separated on the multimedia playback portion 102 that, because the placement points having respectively corresponding to adjacent time codes, the animation's sequence of images has images that appear to "jump" from one placement point to another.

In one embodiment, each of the time codes 108a-108f is positioned in a middle portion of the multimedia file. In another embodiment, one or more of the time codes 108a-108f may include a beginning and/or ending time code of the multimedia file. In one embodiment, the order described herein of time codes 108*a*-108*f* is used by the animation with corresponding placement points and images. In another embodiment, the animation may use a different order of time codes with corresponding placement points and images.

In one embodiment, the animation is a multi-dimensionally linked animation (MLA). As described further herein, an MLA is linked to the playback of a multimedia file through a placement point (e.g., denoting a two-dimensional or three-dimensional point on the multimedia file playback portion 102) and through a corresponding time code, thereby linking the animation to the multimedia media file. The linking between the MLA and the multimedia file may be accomplished through multiple techniques, some of which are also as described further herein. In addition, as described further herein, the placement points and time codes linking an MLA to a particular multimedia file may be determined by several methods.

In one embodiment, the MLA is designed to cover only a portion of the multimedia playback portion 102. In another embodiment, the MLA covers the entire multimedia playback portion 102. The MLA may be designed with any combination or level of opacity and/or transparency. The MLA may include a beginning animation of any size, such as, for example, an image scaled to appear as if it belongs in a scene of the multimedia file (e.g., same size as similar objects in the scene), or an image scaled to appear much larger (e.g., disproportionate to the scene, or "in front of" the scene).

In one embodiment, the MLA may be played by the multimedia player and linking instructions may be performed by the multimedia player to play the MLA beginning at a particular time code 108*a* and originating from a particular placement point 202 on the multimedia file playback portion 102. In one embodiment, the MLA may contain linking instructions. In another embodiment, linking instructions may be separately stored by the multimedia player and/or separately transmitted to the MLA. In one embodiment, the linking instructions may include instructions to perform certain specified actions corresponding with certain specified triggering events (e.g., time codes 108*a*-108*f*) with instructions to let the animation play freely between the specified time codes. In another embodiment, the linking instructions may include a specified action for each time code 108*a*-108*f* spanned by the MLA.

In one embodiment, the linking instructions may contain instructions for actions to be performed at time codes outside of the time codes spanned in the MLA. For example, the linking instructions may include instructions to place a residual image 210 in a showcase portion 110 of the multimedia player interface 200 at a time code not contained between 108*a*-108*f*.

In one embodiment, the linking instructions may contain instructions to perform certain actions based on triggering events including interactions with the cursor 114. For example, as described further herein, a cursor selection of the residual image 210 may cause fulfillment instructions to be executed, including, for example, the display of fulfillment information and/or fulfillment link(s). In another embodiment, other instructions may be transmitted to the multimedia player or may be received by the multimedia player relating to responding to selections by the cursor 114.

In one embodiment, the multimedia player will respond differently with respect to presenting the MLA when a certain time code is reached depending on whether that time code is reached via normal playback or manipulated past the time code using playback controls (e.g., to "fast forward", to skip sections, to scroll, etc.). For example, a multimedia player may present an MLA when a beginning time code 108*a* is reached through normal playback of a multimedia file, but will not present the MLA when the beginning time code is reached through scrolling using the time scroll interface 106. As another example, a multimedia player may present an MLA when a beginning time code is reached in a forward direction, regardless of how that beginning time code is reached, but will not present the MLA when an ending time code 108*f* is reached in a reverse direction (e.g., encountering time codes in reverse chronological order). As another example, a multimedia player may present an MLA when a time code is reached in response only to a first instance where the time code is reached after the multimedia file has been loaded for playback, but not in response to additional instances where the time code is reached.

In another embodiment, the multimedia player will respond similarly with respect to presenting the MLA regardless of how a time code is reached. For example, a multimedia player may present a residual image when an ending time code 108*f* is reached regardless of how that ending time code is reached. As another example, a multimedia player may present the MLA over the multimedia file when the corresponding time codes are reached regardless of whether the time codes are encountered via normal playback or scrolled forward and/or backward using the time scroll interface 106.

In one embodiment, as described further herein, the MLA is presented by the multimedia player in a visual layer overlying the multimedia file playback portion 102. The MLA may be opaque or have any degree of transparency with respect to the underlying playback of the multimedia file. The MLA may appear to "float" over the playback of the multimedia file and/or may appear to be integrated with the multimedia file, depending on the design of the MLA with respect to the multimedia file. For example, elements of MLA may be sized and/or placed over portions of the playback of the multimedia file (e.g., product on a shelf) such that the elements of the MLA may appear to be part of the playback of the multimedia file. Further details about the design of the MLA and its linking to a multimedia file are described further herein.

FIG. 3 shows an embodiment of a multimedia player interface 300 during playback of an exemplary multimedia file, also showing a residual image of an animation and associated content displayed in portions of the multimedia player interface. The showcase portion 110 of the multimedia player interface 300 contains residual image 210, and may contain other residual images 302 and 308. The showcase portion 110 may have a scrolling function 310 allowing residual image 308 to be scrolled out of the showcase portion (e.g., to add a new residual image 210 at the top of a list) and scrolled into the showcase portion after it has been moved out.

In one embodiment, the showcase portion 110 may be automatically managed with respect to the residual images 210, 302, 308 presented therein by the multimedia player based on the playback of the multimedia file and MLA. For example, instructions may be sent to a multimedia player to display a residual image 210 for a specified period of time before removing it. As another example, a residual image 210 may be displayed differently depending on the manner in which time codes related to the residual image were encountered by the multimedia player. In another embodiment, the showcase portion 110 may respond to user input, such as from a cursor 114. For example, a user may scroll the showcase portion 110 using the scroll interface 310 to view different residual images 210, 302, 308.

In one embodiment, the extended palette portion 112 presents fulfillment information 304*a* related to residual image 210. Fulfillment information 304*a* may include, for example, information about a product shown in the residual image 210. In one embodiment, a fulfillment link 306*a* related to residual image 210 may be presented in the extended palette portion 112. The fulfillment link 306*a* may include embedded instructions, for example, for a multimedia player, browser or other program to follow a hyperlink, to purchase a product, to send a message, and/or to connect to a network.

In one embodiment, the extended palette portion 112 of the multimedia player interface 300 may present fulfillment information 304*a* and/or fulfillment link 306*a* based on a selection of the residual image 210, for example, via selection using the cursor 114, whether by overt selection and/or through placing the cursor over the residual image. In another embodiment, the extended palette portion 112 may present fulfillment information 304*a* and/or fulfillment link 306*a* based on instructions, such as delaying presentation until a selected time after presenting the residual image 210. In one embodiment, the fulfillment information 304*a* and the fulfillment link 306*a* is presented together in the multimedia player interface 300 based on the same criteria or triggering events. For example, a triggering event such as a selection of the residual image by the cursor 114 or the passage of a predetermined time may cause both the fulfillment information 304*a* and the fulfillment link 306*a* to be presented. In one embodiment, a cursor 114 placed over the residual image 210 causes fulfillment information 304*a* to be presented, while overt selection (e.g., mouse click) of the residual image causes a fulfillment link to be followed (e.g., the fulfillment link 304 may be imbedded within the residual image 210). In another embodiment, the fulfillment information 304*a* and fulfillment link 306*a* are presented by the multimedia player based the same criteria or triggering events. For example, a selection of a residual image 210 may cause the presentation of fulfillment information 304*a* and a further triggering event (e.g., a selection of that fulfillment information or a passage of a predetermined time) must occur before the fulfillment link 306*a* is presented.

In one embodiment, other fulfillment information 304*b* and/or another fulfillment link 306*b* relating to another residual image 302 may be presented in the extended palette portion 112. In one embodiment, fulfillment information 304*a* and/or fulfillment link 306*a* may be presented at the same time as other fulfillment information 304*b* and/or another fulfillment link 306*b*. In another embodiment, the multimedia player may only present fulfillment information and/or a fulfillment link related to one residual image at a time. For example, a triggering event that causes fulfillment information 304*a* and/or fulfillment link 306*a* to be displayed may cause other presently-displayed fulfillment information 304*b* and/or another presently-displayed fulfillment link 306*b* to be removed from the extended palette portion 112.

In one embodiment, triggering events described further herein that may determine whether an MLA is presented and/or whether a related-residual image is presented may be used to determine whether fulfillment information is presented and/or whether a fulfillment link is presented. For example, the circumstances surrounding how a time code (e.g., time code 108*a*) is encountered may determine whether or how fulfillment information and/or a fulfillment link is presented.

Figure 4:
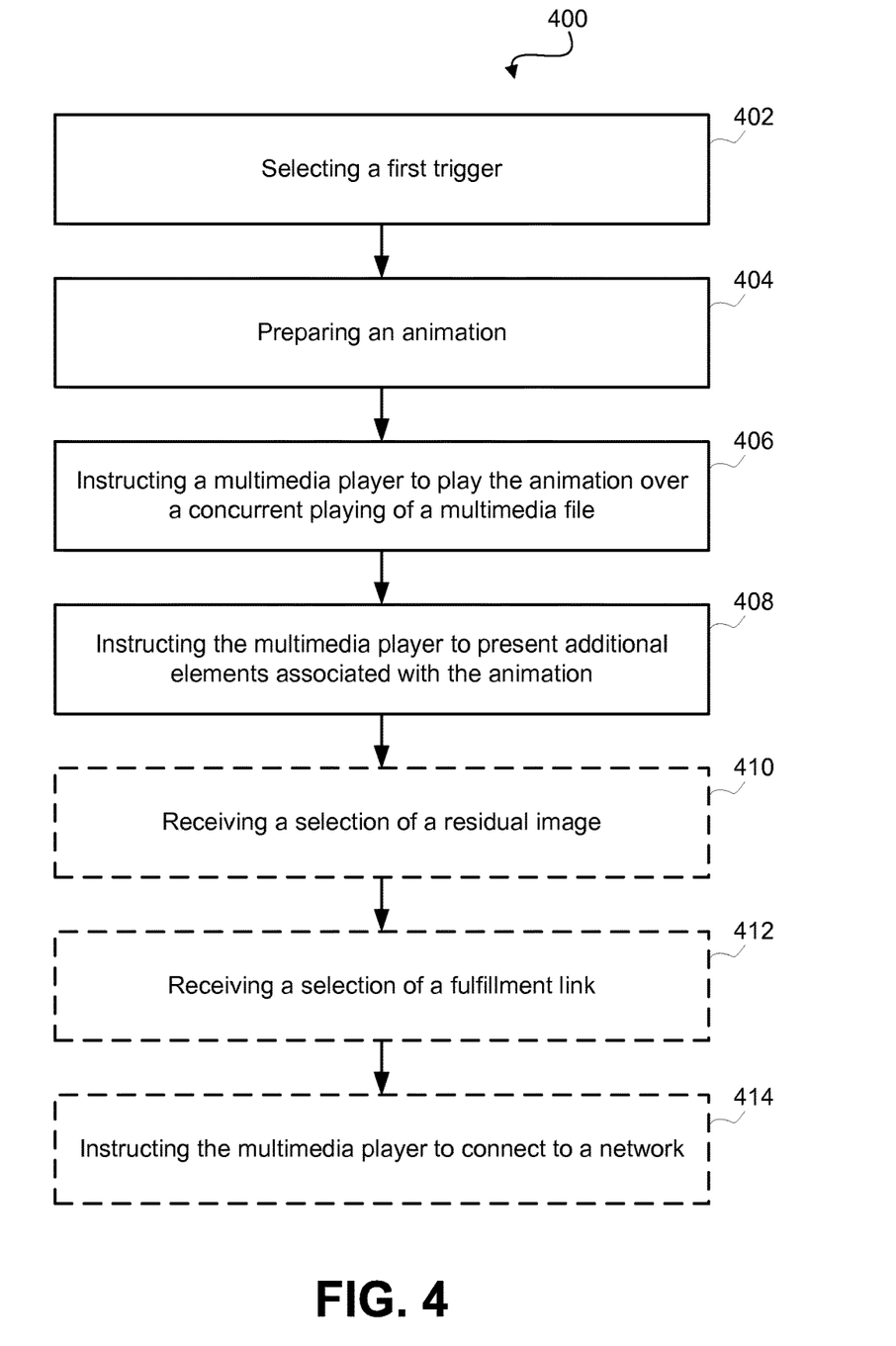
FIG. 4 illustrates an embodiment of a method of playing an animation over a concurrent playing of a multimedia file.

FIG. 4 illustrates an embodiment of a method 400 of playing an animation over a concurrent playing of a multimedia file. The process includes selecting a first trigger in step 402, for example, a word that relates to an advertisement goal. In one embodiment, the first trigger selected in step 402 occurs in a multimedia file, such as, for example, a word in a transcript of the multimedia file, an image appearing in the multimedia file, and/or a description of the context of the multimedia file. For example, the contents of the multimedia file may have a first word or a related context that relates to or suggests the first trigger. As another example, the first trigger may be a synonym or a related word to a word in the audio track or description of the contents of the multimedia file.

In another embodiment, the first trigger selected in step 402 is a word that relates to a focus of an advertisement campaign. For example, selecting a first trigger in step 402 may be performed to achieve certain advertising purposes before a related multimedia file is selected for linking with an animation.

The process 400 includes preparing an animation in step 404 from the first trigger. In one embodiment, as described further herein, the animation may be a multi-dimensionally linked animation (MLA). As described further herein, the animation may be prepared in step 404 before or after a multimedia file is selected for linking with the animation. In one embodiment, a particular placement point and time code may be determined from a multimedia file and the animation may be prepared in step 404 specifically contemplating linking the animation with that placement point and time code. In another embodiment, a placement point and time code may be determined for a multimedia file after an animation is prepared in step 404.

The process 400 includes instructing a multimedia player to play the animation over a concurrent playing of a multimedia file in step 406. As further described herein, the multimedia player may be instructed in step 406 to play (e.g., present, display) the animation in a visual layer overlying a multimedia file playback portion of the multimedia player. As further described herein, the playback of a multimedia file may affect how an MLA is presented or played. In step 406, the instructions for the multimedia player may include instructions for how playback of a multimedia file and presentation of the MLA are linked. For example, a multimedia player may be instructed in step 406 to present an MLA and/or residual images only when a specified time code is reached during normal playback of a multimedia file.

Instructing the multimedia player to play the animation over a concurrent playback of a multimedia file in step 406 may be performed through instructions formatted to be interpreted by various technologies. For example, instructions may be sent to machines operating or capable of interpreting instructions for technologies such as Java, HTML5, Flash, or Silverlight. For example, instructions may be included in an action script for presentation by a Flash program. The multimedia player may integrate with one of the technologies to various extents. In one embodiment, the instructions may be adapted to be interpreted by a native functionality of the multimedia player. In another embodiment, the instructions may be adapted to be interpreted by a technology adapted to work with the multimedia player (e.g., Internet browser, plug-in).

Instructions in step 406 may be to present or display the MLA on a layer separate from the layer on which the multimedia file is presented. For example, a multimedia player or a technology working with the multimedia player may include an additional layer on which the animation may be presented overlying a concurrent playback of the multimedia file, as described further herein.

The process 400 includes instructing a multimedia player to present additional elements associated with the animation in step 408. As described further herein, the additional elements may include residual image(s), fulfillment information and/or fulfillment link(s). In one embodiment, step 408 is performed separately from instructing the multimedia player to play an animation in step 406. In another embodiment, step 408 is performed at the same time or through the same instructions as step 406. For example, an MLA may be transmitted to the multimedia player with instructions for playing the animation over a concurrent playback of the multimedia file and for presenting additional elements associated with the animation.

The process 400 includes receiving a selection of a residual image in step 410 and receiving a selection of a fulfillment link. Steps 410 and 412 are shown in broken lines as optional steps in the process 400, as described further herein with respect to receiving selections of various elements (e.g., through a cursor) and actions triggered thereby. In one embodiment, selections are received to trigger certain actions, as described further herein. In another embodiment, actions are performed based on instructions without first receiving a selection, as described further herein.

In one embodiment, a selection of a residual image is received in step 410 and/or a selection of a fulfillment link is received in step 412 by an apparatus performing the process 400. In another embodiment, a selection of a residual image and/or fulfillment link are received in steps 410 and 412 by another apparatus. For example, the process 400 may be performed by a computing machine located remotely from the multimedia player, and the multimedia player (or machine operating the multimedia player) may receive a selection and perform an action. As another example, as described further herein, the action(s) may be based on some other criteria (e.g., passage of a predetermined period of time, delay), as described further herein.

The process 400 includes the optional step 414 of instructing the multimedia player to connect to a network. As described further herein, the step 414 may be performed by another apparatus and/or may be performed based on instructions sent at a different time and triggered based on some event occurring on another apparatus. In one embodiment, step 414 includes instructing the multimedia player to follow fulfillment link instructions as selected (e.g., by a cursor) or as triggered (e.g., by a passage of time). In another embodiment, step 414 includes instructing the multimedia player to retrieve fulfillment information from a network.

Figure 5:
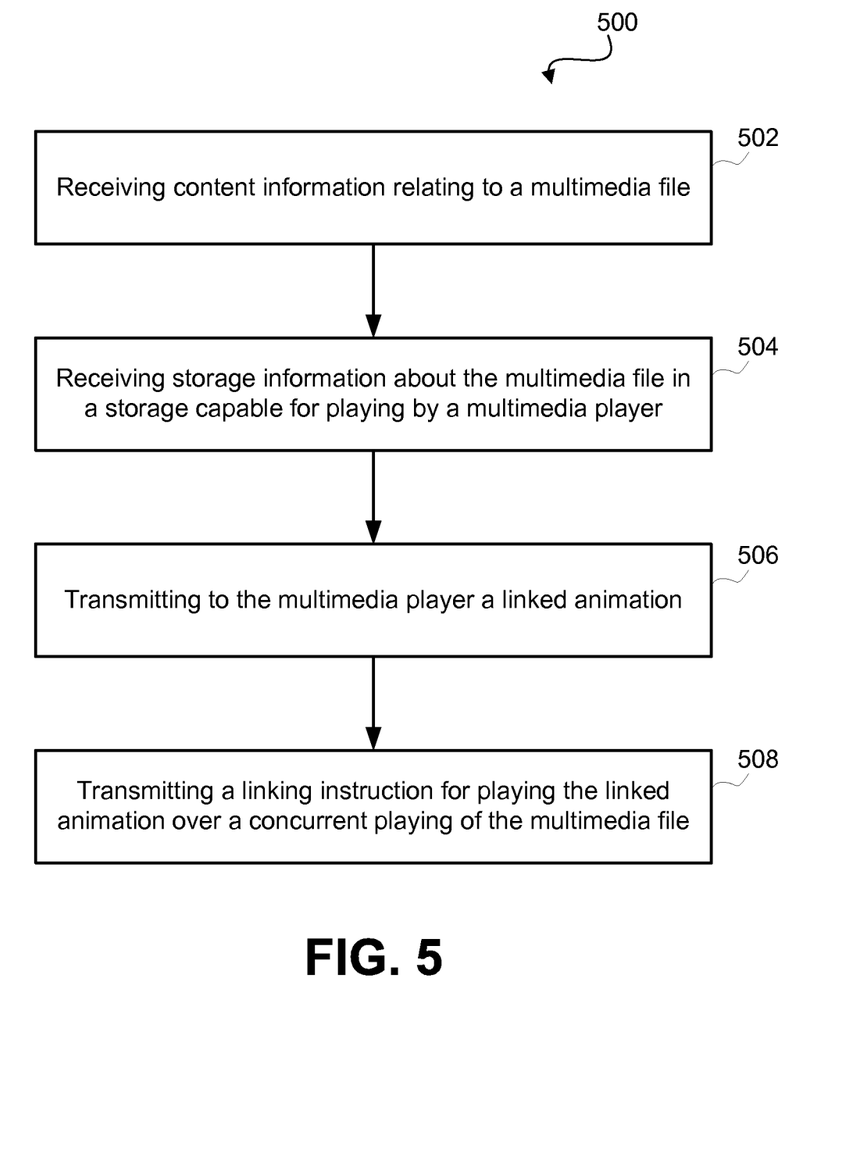
FIG. 5 illustrates an embodiment of a method for transmitting a linked advertisement for playing with a concurrent playing of a multimedia file.

FIG. 5 illustrates an embodiment of a method 500 for transmitting a linked advertisement for playing with a concurrent playing of a multimedia file. The process 500 includes receiving information relating to the content of a multimedia file in step 502. In one embodiment, the content information includes a transcript of words and/or themes of the content (e.g., audio, video) of a multimedia file. In another embodiment, the content information includes reviews or opinions of the multimedia file. For example, a multimedia file may receive reviews, comments, or tags relating to the content of the multimedia file at an Internet site that hosts the multimedia file.

The process 500 includes receiving storage information about the multimedia file in step 504. The storage information may be related to a storage with any level of permanence, such as, for example, a permanent storage or a temporary storage (e.g., random access memory). In one embodiment, the storage information received in step 504 includes information that the storage is associated with a multimedia player or otherwise adapted or capable of being accessed by the multimedia player. In another embodiment, the storage information received in step 504 includes information that the multimedia player has accessed the storage (e.g., for the purpose of playing or preparing to play the multimedia file). In one embodiment, the storage information received may consist of information that the multimedia file is ready to be played by a multimedia player and/or information that the multimedia file is being prepared to be played.

In one embodiment, the storage information may be received in step 504 from an apparatus containing the storage. In another embodiment, the storage information may be received in step 504 from another apparatus apart from the apparatus containing the storage.

The process 500 includes transmitting a linked animation to the multimedia player in step 506. As further described herein, in one embodiment, the linked animation may be an MLA and may include instructions for linking the MLA to a multimedia file. In another embodiment, also further described herein, the linked animation may be transmitted separately from instructions for the multimedia player for linking the animation to a multimedia file. For example, a plurality of multimedia files may reside on storage connected to a machine with a multimedia player while an animation may operate on a separate machine with storage, and a third machine may instruct the multimedia player to link the animation to one or more of the plurality of multimedia files, as described further herein.

The process 500 includes transmitting a linking instruction in step 508 for playing the linked animation over a concurrent playing of the multimedia file. As described further herein, the linking instruction may include one or more placement points and one or more time codes corresponding to an animation, for example to display the start of the animation's sequence of images over a particular placement point and at a particular time code. Also as described further herein, the linking instruction may include instructions for the playback of the animation, such as playing certain portions in sequence, pausing playback for a highlighted image to be displayed, and playing certain portions or the whole animation only if certain events occur (e.g., selection by a cursor, passage of pre-determined time).

In one embodiment, the linking instruction is transmitted in step 508 to a multimedia player while it is preparing to present a multimedia file. In another embodiment, the linking instruction is transmitted in step 508 at an earlier time, for example when a bid or payment is made for an advertisement placement. In one embodiment, the linking instruction is transmitted before a multimedia file is selected and/or stored in a storage adapted to be used by a multimedia player (e.g., random access memory).

Figure 6:
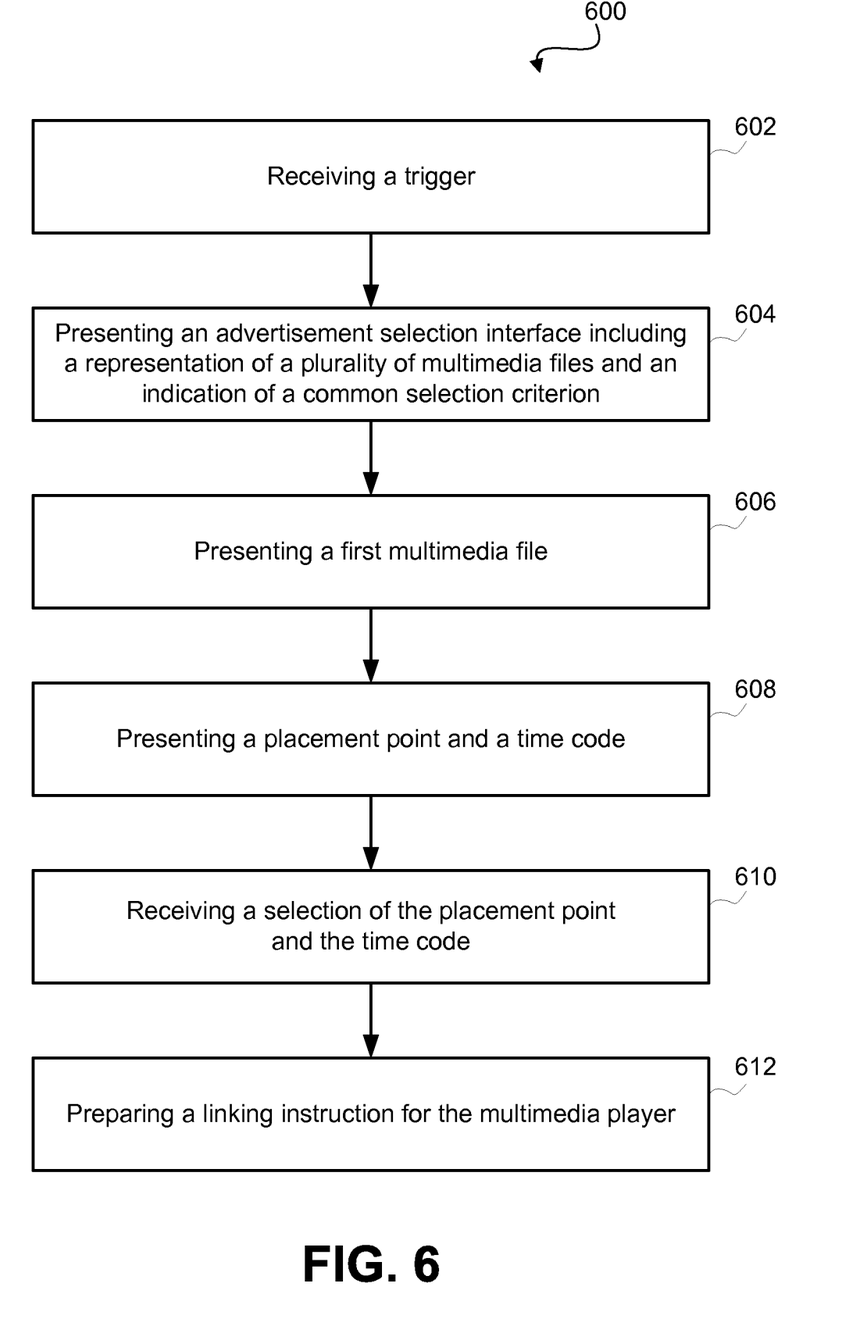
FIG. 6 illustrates an embodiment of a method of presenting an advertisement selection interface.

FIG. 6 illustrates an embodiment of a method 600 of presenting an advertisement selection interface. The process 600 includes receiving a trigger in step 602. A trigger may be any portion of a multimedia file, explicitly or implicitly or related to the multimedia file. For example, a trigger may be a word, an image, a color, an embedded file (e.g., an audio file), a scheduled event and/or any combination thereof. In one embodiment, in step 602, a trigger in the form of a word is received that is a focused theme of an advertisement campaign or a word that describes and/or matches a content item of a multimedia file (e.g., a transcript word). In one embodiment, the trigger received in step 602 is a word meeting a threshold of relevance to a public relations or advertisement campaign. In another embodiment, the trigger received in step 602 is a descriptive or generic term for a service or product being advertised by the animation. In another embodiment, the trigger received in step 602 is a trademark (e.g., an image, a word). In another embodiment, the trigger received in step 602 is a description of a scene or the description of an event (e.g., dramatic event, title of an event) occurring in the multimedia file.

The trigger received in step 602 may represent a common content item of a plurality of multimedia files. For example, as described further herein, a content item (e.g., a word, a scene description) may be commonly shared between multiple multimedia files and may be presented by an advertisement selection interface. In one embodiment, a trigger may be received in step 602 from a selection of a portion of a playback of a multimedia file where and/or when the content item is presented. In another embodiment, a trigger received in step 602 may be a plurality of common content items. For example, a plurality of groups of multimedia files (which may or may not share some multimedia files in multiple groups) may be associated with a plurality of common content items. The plurality of common content items may be presented, such as by an advertisement selection interface, and a common content item may be selected, for example, in the creation and/or evaluation of multiple exemplary advertisement strategies, as described further herein.

In one embodiment, based on the received trigger in step 602, or through another process or procedure, a word is selected, such as, for the focus of an advertisement campaign. The word selected may relate to a content item portrayed in a multimedia file, as described further herein, including a spoken word from an audio track, a theme, a scene element, or a dramatic event. In one embodiment, the word and/or related content item is contained in multiple multimedia files and is a common content item of the multiple multimedia files. For example, a café countertop may be a common content item because it is a content item that appears in multiple multimedia files. In another embodiment, closely analogous or synonymous content items may be considered similar enough (e.g., through a measurement of similarity) that any content item in the group of similar content items may be considered a common content item across multiple multimedia files. For example, a café countertop and a restaurant table may be considered common content items based on a measurement of similarity.

The process 600 includes presenting an advertisement selection interface in step 604. The advertisement selection interface may be presented to a user, for example to an advertising account manager. In one embodiment, the advertisement selection interface includes a visualization component, visualization features, graphical user interfaces, and/or other user interfaces that allow an advertising account manager to visualize an exemplary placement or distribution of advertisements across aspects of many multimedia files. For example, an advertisement selection interface may present an exemplary selection of multimedia files and placements based on a trigger received in step 602 and/or other criteria, such as a selected advertising budget or cost for placing and linking an animation with one or more multimedia file(s). A visualization component of the advertisement selection interface may allow an advertising account manager to review the overall placement (e.g., suggested placement points and time codes) of animations to be linked with many multimedia files based on a combination of selection criteria such as, for example, advertisement budget or cost, type of multimedia files, word matched to a common content item of the multimedia files and/or degree of similarity of the word and the common content item.

By manipulating the criteria and viewing the advertisement selection interface, an advertising account manager may preview the different strategies and parameters for placing and/or linking advertisements with those multimedia files under multiple scenarios. For example, an advertising account manager may select a strategy for placing advertisement animations based on a proposed cost (e.g., budget) for the placed advertisements and then review, using the visualization component, how those strategies result in linking advertisement animations with many multimedia files. The placements reviewed may include each of the different linking parameters that are described further herein. The advertising account manager may then revise the strategies for placement and/or the advertising budget to view another proposed placement of advertisements across the multimedia files.

In one embodiment, the advertisement selection interface presented in step 604 includes a multimedia content navigation component. For example, the multimedia content navigation component includes selection tools that allow an operator of the selection interface to prepare placement targets into the content of a multimedia file at certain placement points and time codes within the multimedia file. As another example, the content navigation component may include a multi-dimensional placement component (e.g., two-dimensional, three-dimensional) that is adapted to designate placement points and time codes within a multimedia file. In one embodiment, the content navigation component is adapted to receive placement points and time codes that would serve as potential advertisement placement sites within the multimedia file without a specified animation or without a specified placement point or time code in an animation. In another embodiment, the content navigation component is adapted to receive a placement point and time code for a specified animation within one or more specified multimedia files. For example, these placement points and time codes may include locations and time codes where a product may be placed within the multimedia file in order to capitalize on some relationship between the product and the content of the multimedia file occurring at the specified placement point and time code of the multimedia file. In one embodiment, the content navigation component is adapted to present a portion of the multimedia content, separately or combined with others, such as an audio track, a video screen, and/or ancillary data for the multimedia content, such as a closed captioning screen or a text transcription file.

In one embodiment, the advertisement selection interface presented in step 604 includes a content relevance designation component that allows an operator, a processor, or other machine to associate certain relevance factors and/or attributes with a placement point and/or time code within the multimedia file. The relevance designation component may include relevance parameters, for example, that associate words and audio tracks of the multimedia content with synonyms of those words and/or potential advertised products associated with those words and audio tracks. The relevance designation component may include relevance parameters related to semantic analysis, syntactic analysis, and/or natural language processing. As another example, other ancillary data may be used to create similar associations. For example, breaks in dialogue and/or other audio cues may be associated with certain advertising parameters and/or products, and may be so designated in the relevance designation component.

In one embodiment, the relevance associated with particular placement points and time codes in the multimedia content may include subjective factors, such as tones or feelings expressed in the content of the multimedia file. Both subjective relevance determinations may be used alongside, or in any relationship with, objective relevance indications (e.g., words used in an audio track).

In one embodiment, the relevance designated to each placement point and/or time code of the multimedia content may be used to match an advertisement to some points within a piece of multimedia content and not others. For example, the relevance designated to particular placement points and time codes may affect the way in which a particular advertisement placement strategy will result in advertisement placements, such as the price of the placements and the placement points and time codes within the multimedia files. In one embodiment, particular instructions (e.g., with respect to triggering events of residual images, delays) may be priced differently with respect to relevance factors or other factors.

In one embodiment, the advertisement selection interface presented in step 604 may use the visualization component to present multiple scenarios of advertisement placement to an advertising account manager, including various placements of advertisements to different placement points and time codes among many multimedia files. These placement points may be weighted by relevance factors of the points to the advertisements to be placed, as well as various pricing requirements for the placements. The visualization component may also include an interface that allows an advertising account manager to designate particular relevance characteristics that are important for the placement of a particular advertisement in order to tailor the visualization component to provide advertisement placement scenarios to the advertisement manager to match the goal of the advertisement campaign.

The process 600 includes presenting a multimedia file in step 606, as described further herein. In one embodiment, the multimedia file is presented in step 606 by the advertisement selection interface presented in step 604. In another embodiment, the multimedia file is presented in step 606 by another program. For example, the multimedia file may be presented by a computing machine or program and the playback may be selected by and/or connected with the advertisement selection interface.

The process 600 includes presenting a placement point and a time code in step 608. As described further herein, in one embodiment, an advertisement selection interface presents a placement point and a time code in step 608. In another embodiment, a multimedia file is presented along with a placement point and a time code in step 608 as a suggestion for linking an animation to the multimedia file. For example, a placement point and a time code may be presented as associated with an indication of a particular content item, such as a content item that makes the specified placement point and time code relevant for placing the animation and linking it to the placement point and time code. As described further herein, a placement point and a time code may be selected based on a variety of criteria and presenting the placement point and time code in step 608 may be adapted to facilitate that selection.

As described further herein, in one embodiment, a placement point and a time code are presented in step 608 by another process, such as a multimedia player or a browser. For example, a multimedia player may present a playback of a multimedia file which may include the presentation of the placement point and the time code in step 608. As described further herein, processes may be connected to or in communication with an advertisement selection interface and/or a program operating the process 600. For example, receiving a selection (e.g., step 610) may be performed through receiving the selection from a process connected to or in communication with a program operating the process 600.

The process 600 includes receiving a selection of a placement point and a time code in step 610. Receiving the selection in step 610 may be performed through many different means, such as selection by a cursor, as described further herein. In one embodiment, receiving a selection of a placement point and a time code in step 610 includes receiving a selection from a user interface, such as, for example, through selecting a portion of a playback of a multimedia file. In another embodiment, receiving a selection of a placement point and a time code in step 610 includes receiving a selection of an advertisement strategy or a selection of a presented placement of animations overlying multimedia file(s), wherein the selected strategy or placement includes the placement point and the time code.

The process 600 includes preparing a linking instruction for a multimedia player in step 612. Preparing a linking instruction in step 612 may include any of the several embodiments of linking instructions and/or the considerations for linking an animation and a multimedia file that are described further herein.

In one embodiment, the linking instruction prepared in step 612 relates to a single multimedia file. For example, the linking instruction could specify a particular placement point and time code in a multimedia file that is specifically selected, as described further herein, to a particular relevant feature of the multimedia file with the animation. In another embodiment, the linking instruction prepared in step 612 relates to a plurality of multimedia files. For example, as described further herein, the linking instruction prepared in step 612 specifies a broad class or type of placement point and time code that may be selected or interpreted in the plurality of multimedia without a specific animation identified for placement in or linking with multimedia files. As another example, as described further herein, a common content item shared among the plurality of multimedia files is targeted by the linking instruction and the linking instruction includes a placement point and a time code for each multimedia file that corresponds to the occurrence of the common content item in each multimedia file.

As described further herein, the process 600 includes, in one embodiment, presenting a cost associated with a scenario, such as, for example, a placement strategy and/or a particular placement with a specified multimedia file. In one embodiment, a cost may be related to a revenue sharing model, pay-per-click model, or other event-driven model. In one embodiment, a second cost may be received, for example, reflecting a response to the first cost from an advertising account manager operating an advertisement selection interface. In one embodiment, the process 600 will prepare a second set of linking instructions reflecting the second cost. In another embodiment, the process 600 will determine a second multimedia file or group of multimedia files reflecting the second cost. In another embodiment, the process 600 will prepare a second linking instruction and determine a second multimedia file. The process 600 may prepare a second scenario for placement of animations (e.g., a placement strategy) in response to receiving a second cost based on the determinations and/or considerations for placing/linking animations, as described further herein.

Figure 7:
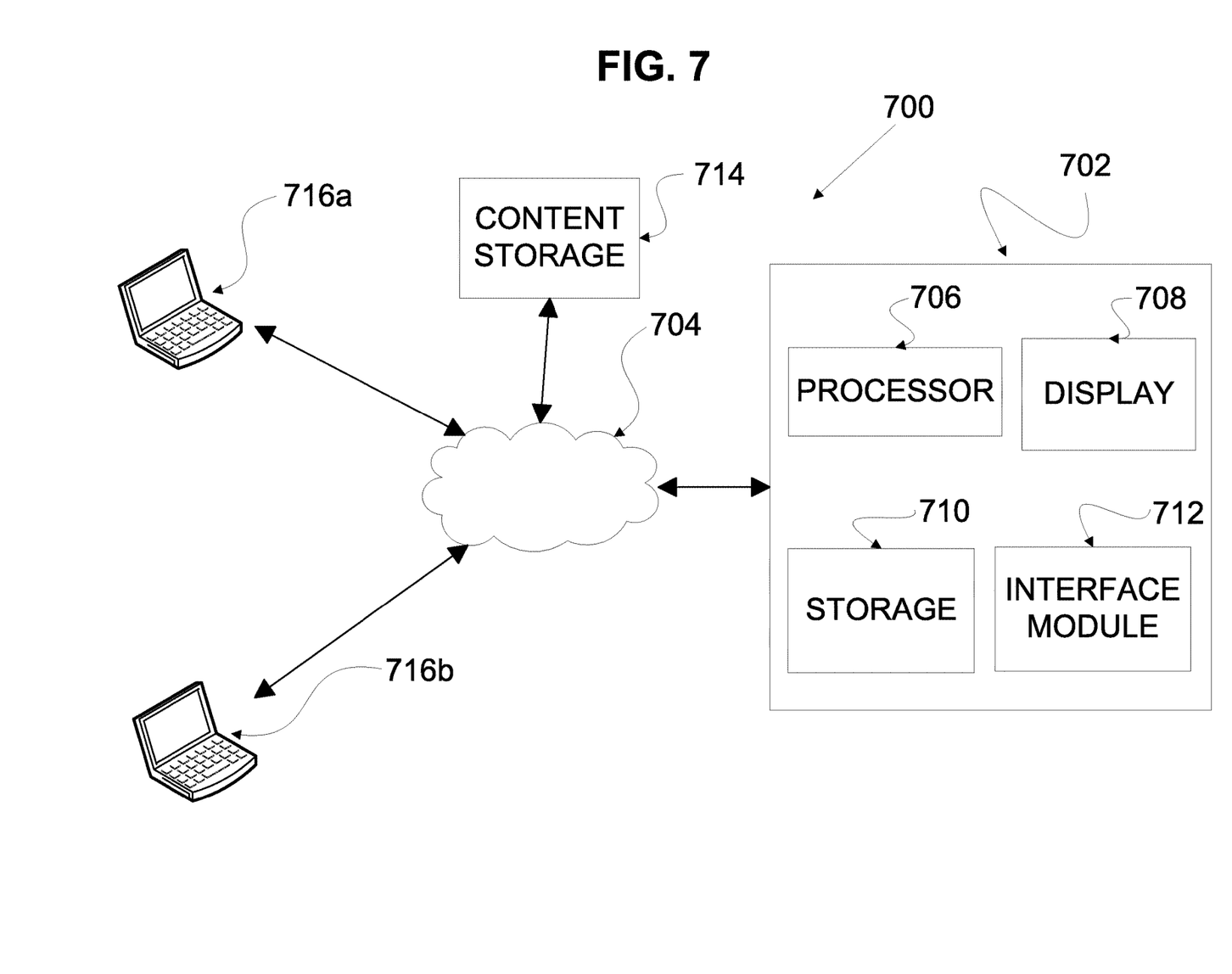
FIG. 7 is a schematic representation of an embodiment of a system for linking animations and multimedia files.

FIG. 7 is a schematic representation of an embodiment of a system 700 for linking animations and multimedia files. System 700 includes a machine 702 (e.g., computer) that is connected to a network 704 and that includes a processor 706, a display 708, a storage 710, and an interface module 712. Machine 702 may also include, for example, another storage in addition to storage 710, such as a memory (e.g., volatile, nonvolatile), a power supply unit, a real-time clock, a hard disk drive, and/or a network interface card (NIC). Interface module 712 may include or be adapted to work with display 708, and may further include an input/output unit, a keyboard, and/or a pointing device (e.g., for controlling a cursor). Machine 702 may connect to network 704, which may be the Internet or a local network, and the local network may or may not have connections to the Internet. The network 704 may also be a wired network, power-line network, radio, wireless, 802.11 network, infrared network, ultrasound network, etc. Many other devices and modifications that are well known may be used instead of, or in addition to, the components shown of system 700, without departing from the broader spirit and scope of the description herein.

The system 700 includes a content storage 714 connected to the network 704. In one embodiment, the content storage 714 is a public or semi-public online repository of animations and/or multimedia files. For example, a content storage 714 may be an online video service such as YouTube, Flikr, Hulu, or The Internet Archive (hosted presently at <archive.org>). In another embodiment, the content storage 714 is a private or proprietary storage of animations and/or multimedia files. For example, a private storage may store animations for a particular advertisement campaign. As another example, a proprietary storage may store multimedia files that appeal to a particular audience and/or adapted for linking animations, as described further herein.

In one embodiment, the content storage 714 is used by the machine 702 via connecting through the network 704 in performance of the methods described further herein. In one embodiment, additional machines 716a and 716b perform some of the processes and/or run some of the programs described herein, such as, for example, multimedia player (s). For example, determinations about content in a multimedia player (e.g., transcription of audio tracks, determination of placement points and time codes) may be executed on or by a machine 716a connected to the network 704. In another embodiment, additional machines 716a and 716b may be used to access an advertisement selection interface.

In one embodiment, the multimedia player is hosted at an Internet site remote from machine 702. For example, the multimedia player may connect over a network 704 to a content storage 714 (e.g., multimedia file storage location), and processes described further herein may transmit instructions (e.g., placement instructions, linking instructions) over the network (e.g., Internet) for the multimedia player to play an animation overlying a concurrent playing of the multimedia file. In another embodiment, a multimedia player and a program operating a process described herein (e.g., for linking an animation and a multimedia file played by the multimedia player) resides on the same computing machine, such as machine 702.

Descriptions of methods herein may be implemented in software, firmware, hardware and/or in any combination thereof. For example, methods may be implemented in hardware, such as computers (e.g., general purpose machines, embedded computing machines). Descriptions of apparatus or systems herein may be implemented in software, firmware, hardware and/or in any combination thereof. For example, systems may be implemented as virtual machines in software. Communication connections described further herein may be implemented in any form of communications technology or combination thereof, such as, for example, hardware bus, Internet Protocol (IP) connections, and/or proprietary connections.

It is clear that many modifications and variations of this embodiment can be made by one skilled in the art without departing from the spirit of the novel art of this disclosure. For example, the systems and method herein disclosed can be applied to many different multimedia systems. Also, while specific reference to advertisements may have been disclosed, other animations and multimedia files may also be used. These modifications and variations do not depart from the broader spirit and scope of the present disclosure, and the examples cited here are illustrative rather than limiting.

What is claimed:

1. A method comprising:
   receiving, by a processor, a trigger identifying a content item, the trigger comprising at least one word appearing in a multimedia file transcript;
   communicating, by the processor, a selection interface to a client device;
   communicating, by the processor, a first multimedia file to the client device, wherein the selection interface allows a selection of a plurality of placement points in a scene presented in playback of the first multimedia file, the placement points defined by a user of the client device and representing a multi-dimensional point overlaid over the first multimedia file, the plurality of placement points including a last placement point located within a distinct showcase portion of a multimedia player, the distinct showcase portion being different than an area displayed by the multimedia player used to play the first multimedia file;
   receiving, by the processor from the client device, an identification of the placement points selected using the selection interface, the identification of the placement points forming a path synchronized with time codes associated with the first multimedia file;
   determining, by the processor via a transcription of the first multimedia file, an initial time code in the time codes identifying when the content item of the trigger occurs in the playback of the first multimedia file, the initial time code representing a point in the first multimedia file where the at least one word appears;
   preparing, by the processor, a linking instruction identifying an animation, the selected placement points and the initial time code; and
   transmitting, by the processor, the linking instruction to the multimedia player playing back the first multimedia file, the linking instruction causing the multimedia player to overly the animation at each placement point in the scene identified by the initial time code.

2. The method of claim 1, wherein the selection interface comprises a content relevance designation component that enables association of certain relevance factors and attributes with the placement points and initial time code.

3. The method of claim 2, wherein the relevance designation component includes relevance parameters that associate words and audio tracks of multimedia content with synonyms of those words.

4. The method of claim 2, wherein the relevance designation component includes relevance parameters that associate words and audio tracks of multimedia content with potential advertised products associated with those words and audio tracks.

5. The method of claim 2, wherein the relevance designation component includes relevance parameters related to semantic analysis.

6. The method of claim 2, wherein the relevance designation component includes relevance parameters comprising subjective factors.

7. The method of claim 2, wherein the relevance factors are used to match an advertisement to some points within a piece of multimedia content.

8. A computing device comprising:
a processor;
a storage medium for tangibly storing thereon program instructions which, when executed by the processor, instruct the processor to at least:
receive a trigger identifying a content item, the trigger comprising at least one word appearing in a multimedia file transcript;
communicate a selection interface to a client device;
communicate a first multimedia file to the client device, wherein the selection interface allows a selection of a plurality of placement points in a scene presented in playback of the first multimedia file, the placement points defined by a user of the client device and representing a multi-dimensional point overlaid over the first multimedia file, the plurality of placement points including a last placement point located within a distinct showcase portion of a multimedia player, the distinct showcase portion being different than an area displayed by the multimedia player used to play the first multimedia file;
receive, from the client device, an identification of the placement points selected using the selection interface, the identification of the placement points forming a path synchronized with time codes associated with the first multimedia file;
determine, via a transcription of the first multimedia file, an initial time code in the time codes identifying when the content item of the trigger occurs in the playback of the first multimedia file, the initial time code representing a point in the first multimedia file where the at least one word appears;
prepare a linking instruction identifying an animation, the selected placement points and the initial time code; and
transmit the linking instruction to the multimedia player playing back the first multimedia file, the linking instruction causing the multimedia player to overly the animation at each placement point in the scene identified by the initial time code.

9. The computing device of claim 8, wherein the selection interface comprises a content relevance designation component that enables association of certain relevance factors and attributes with the placement points and initial time code.

10. The computing device of claim 9, wherein the relevance designation component includes relevance parameters that associate words and audio tracks of multimedia content with synonyms of those words.

11. The computing device of claim 9, wherein the relevance designation component includes relevance parameters that associate words and audio tracks of multimedia content with potential advertised products associated with those words and audio tracks.

12. The computing device of claim 9, wherein the relevance designation component includes relevance parameters related to semantic analysis.

13. The computing device of claim 9, wherein the relevance designation component includes relevance parameters comprising subjective factors.

14. The computing device of claim 9, wherein the relevance factors are used to match an advertisement to some points within a piece of multimedia content.

15. A non-transitory computer-readable storage medium with a first executable program stored thereon, wherein when executed by a processor the first executable program instructs the processor to perform a method, the method comprising:
receiving, by the processor, a trigger identifying a content item, the trigger comprising at least one word appearing in a multimedia file transcript;
communicating, by the processor, a selection interface to a client device;
communicating, by the processor, a first multimedia file to the client device, wherein the selection interface allows a selection of a plurality of placement points in a scene presented in playback of the first multimedia file, the placement points defined by a user of the client device and representing a multi-dimensional point overlaid over the first multimedia file, the plurality of placement points including a last placement point located within a distinct showcase portion of a multimedia player, the distinct showcase portion being different than an area displayed by the multimedia player used to play the first multimedia file;
receiving, by the processor from the client device, an identification of the placement point selected using the selection interface, the identification of the placement points forming a path synchronized with time codes associated with the first multimedia file;
determining, by the processor via a transcription of the first multimedia file, an initial time code in the time codes identifying when the content item of the trigger occurs in the playback of the first multimedia file, the initial time code representing a point in the first multimedia file where the at least one word appears;
preparing, by the processor, a linking instruction identifying an animation, the selected placement points and the initial time code; and
transmitting, by the processor, the linking instruction to the multimedia player playing back the first multimedia file, the linking instruction causing the multimedia player to overly the animation at each placement point in the scene identified by the initial time code.

* * * * *